United States Patent
Smith (12) 
(10) Patent No.: US 8,243,341 B2
(45) Date of Patent: Aug. 14, 2012

(54) IMAGING DEVICE WITH ADJUSTABLE IMAGING SURFACE

(75) Inventor: Dana S. Smith, Dana Point, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 945 days.

(21) Appl. No.: 12/154,866

(22) Filed: May 28, 2008

(65) Prior Publication Data

US 2009/0296169 A1 Dec. 3, 2009

(51) Int. Cl.
*H04N 1/40* (2006.01)
*H04N 1/387* (2006.01)

(52) U.S. Cl. .................................. 358/448; 358/453

(58) Field of Classification Search ................... 358/448
See application file for complete search history.

(56) References Cited

U.S. PATENT DOCUMENTS

2004/0169894 A1* 9/2004 Schroath et al. .............. 358/474

FOREIGN PATENT DOCUMENTS

JP H1-179660 12/1989
JP 2008066961 3/2008

* cited by examiner

*Primary Examiner* — James A Thompson
(74) *Attorney, Agent, or Firm* — Scot A. Reader

(57) ABSTRACT

An imaging device has an adjustable imaging surface that can be readily enlarged by a user from a first size to a second size and reduced by the user from the second size to the first size to meet imaging requirements. The imaging device thus permits imaging of larger documents than its desktop footprint would conventionally support. For example, when a user of such an imaging device has a full sheet document that requires flatbed scanning, the user can temporarily enlarge the imaging surface from half sheet size to full sheet size and scan the document. Once the user has scanned the document, the user can reduce the imaging surface from the full sheet size to the half sheet size to reduce the desktop footprint of the imaging device.

19 Claims, 6 Drawing Sheets

IMAGING DEVICE WITH ADJUSTABLE IMAGING SURFACE

BACKGROUND OF THE INVENTION

The present invention relates to imaging devices and, more particularly, to imaging devices with improved size/performance characteristics.

Imaging devices often provide a flatbed imaging surface to enable scanning or copying of original documents that cannot be sheet-fed. Such original documents may be, for example, bound, torn, too large, too small or too wrinkled for sheet feeding. A flatbed imaging surface typically includes a glass platen having a surface area that accommodates full letter or legal size sheets. The flatbed imaging surface thus adds substantially to the footprint of these imaging devices on a desktop.

Some imaging devices having flatbed imaging surfaces have been designed to minimize the impact of the flatbed imaging surface on the desktop footprint. In some devices, the flatbed imaging assembly is detachable so that it can be removed when not needed. While reducing the footprint, the user of these devices must spend time and effort removing, storing, locating and reattaching the assembly. In other devices, the flatbed imaging surface accommodates only one-half of a letter, legal or A4 size sheet. While reducing the footprint, the user of these devices must scan or copy the first half of an original document, then spend extra time and effort repositioning the document and scanning or copying the second half of the document.

SUMMARY OF THE INVENTION

The present invention, in a basic feature, provides an imaging device having an adjustable imaging surface. The imaging surface can be readily enlarged by a user from a first size to a second size and reduced by the user from the second size to the first size to meet imaging requirements. The imaging device thus permits imaging of larger documents than its footprint would conventionally support. For example, when a user of such an imaging device has a full sheet document that requires flatbed scanning, the user can temporarily enlarge the imaging surface from half sheet size to full sheet size and scan the document. Once the user has scanned the document, the user can reduce the imaging surface from the full sheet size to the half sheet size to reduce the footprint of the imaging device.

In one aspect of the invention, an imaging device having an adjustable imaging surface comprises a first section having a first imaging surface and a second section coupled with the first section and having a second imaging surface, wherein the imaging device is adjustable between a first position and a second position through relative movement of the first section and the second section, wherein in the first position the adjustable imaging surface is a reduced imaging surface that includes the first imaging surface and wherein in the second position the adjustable imaging surface is an enlarged imaging surface that includes the first imaging surface and the second imaging surface.

In some embodiments, the first imaging surface and the second imaging surface are transparent platen surfaces. In some embodiments, the imaging device has software executable by a processor to repair imaging defects attributable to a junction between the first imaging surface and the second imaging surface. In some embodiments, the imaging device is a scanner. In some embodiments, the imaging device is a copier. In some embodiments, the imaging device is a multi-function printer (MFP).

In some embodiments, the first position comprises a folded position and the second position comprises an unfolded position. The device has a larger footprint in the second position. The relative movement comprises pivoting about a hinge.

In some embodiments, the first imaging surface abuts the second imaging surface while the imaging device is in the second position. A connector holds the first section and the second section in abutment while the imaging device is in the second position. The first section and the second section have respective lids and removable end panels while the imaging device is in the first position and after removal at least one of the end panels conjoins the lids while the imaging device is in the second position.

In some embodiments, the first imaging surface and the second imaging surface are at an angular offset while the imaging device is in the second position. A gap cover is interposed between the first imaging surface and the second imaging surface while the imaging device is in the second position. The first section and the second section have respective removable lids while the imaging device is in the first position and after removal at least one of the lids holds the first section and the second section at the angular offset while the imaging device is in the second position.

In some embodiments, the first position comprises a collapsed position and the second position comprises an extended position. The relative movement comprises sliding.

In another aspect of the invention, a method for adjusting an imaging device to meet present imaging requirements comprises the steps of pivoting a first section of the imaging device about a hinge to enlarge an adjustable imaging surface and a footprint of the imaging device, imaging a document on the enlarged adjustable imaging surface and pivoting the first section about the hinge to reduce the adjustable imaging surface and the footprint.

In yet another aspect of the invention, a method for adjusting an imaging device to meet present imaging requirements comprises the steps of sliding a first section of the imaging device away from a second section of the imaging device to enlarge an adjustable imaging surface and a footprint of the imaging device, imaging a document on the enlarged adjustable imaging surface and sliding the first section toward the second section to reduce the adjustable imaging surface and the footprint.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
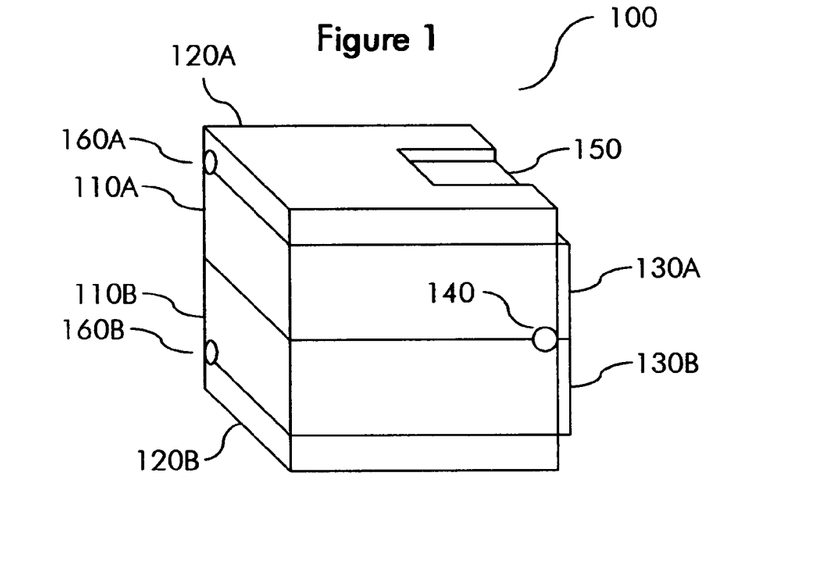
FIG. 1 is a perspective view of an imaging device having an adjustable imaging surface in a folded position.

FIG. 1 shows an imaging device 100 having an adjustable imaging surface in a folded position. Device 100 may be a scanner, copier or MFP, for example. Device 100 may serve as a peripheral of a client computer, or as a network-attached imaging station utilized by many client computers. Moreover, device 100 may be a stand-alone peripheral or station or a modular component of a larger peripheral or station. Device 100 has an upper section 110A resting on a lower section 110B. Upper section 110A and lower section 110B are coupled at and arranged to pivot about a hinge 140 to adjust device 100 from the folded position to an unfolded position, and vice versa, to meet present flatbed imaging requirements. Upper section 110A has an upper section lid 120A and lower section 110B has a lower section lid 120B. Lids 120A, 120B are coupled to sections 110A, 110B, respectively, by hinges 160A, 160B. Lids 120A, 120B hold documents in place on imaging surfaces of sections 110A, 110B during imaging. Upper section 110A also has an upper end panel 130A and lower section 110B has a lower end panel 130B. End panels 130A, 130B prevent contaminants from penetrating the device enclosure when device 100 is in the folded position. Upper end panel 130A also provides a limit switch for a scan bar within the device cavity when device 100 is in the folded position. Upper section lid 120A has a slot 150 for retaining upper end panel 130A and thereby conjoining lids 120A, 120B when device 100 is in the unfolded position. Lower section lid 120B has a companion slot that is not visible in the figure.

Figure 2:
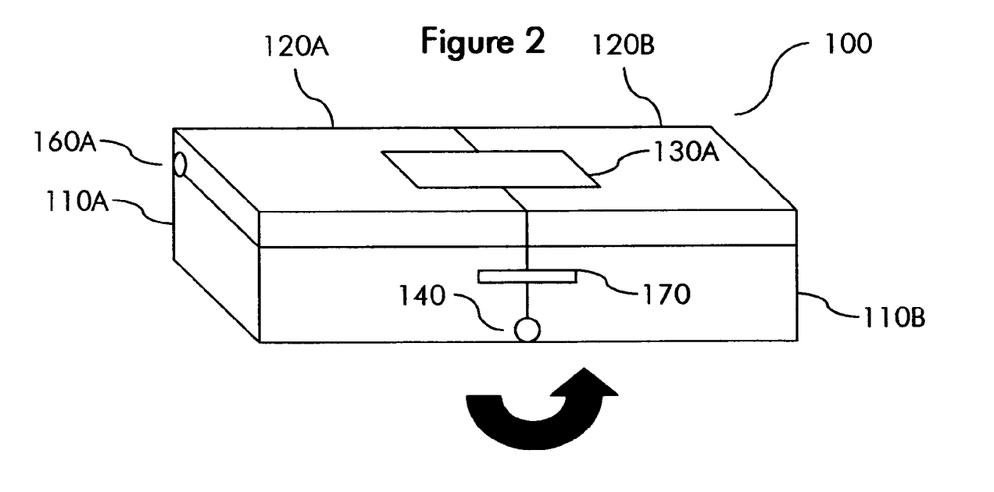
FIG. 2 is a perspective view of the imaging device of FIG. 1 in an unfolded position.

FIG. 2 shows imaging device 100 in an unfolded position suitable for flatbed imaging of loose documents. When device is off or idle and a user of device 100 has a flatbed imaging job that requires an enlarged imaging surface, the user of device 100 adjusts device 100 from the folded position shown in FIG. 1 to the unfolded position shown in FIG. 2 to enlarge the imaging surface to meet present flatbed imaging requirements. The desktop footprint made by device 100 is enlarged incident to enlarging the imaging surface. To make the adjustment, the user removes end panels 130A, 130B, revealing the device cavity, then rotates lower section 110B about hinge 140 to bring the revealed edge of lower section 110B into abutment with the revealed edge of upper section 110A. The user then inserts upper end panel 130A into the contiguous gap formed by slot 150 and its companion slot in lower section lid 120B to conjoin lids 120A, 120B into a single operative unit. In some embodiments, lower end panel 130B is additionally or alternatively used to conjoin lids 120A, 120B. The user also fastens one or more connectors 170 on the sidewalls of sections 110A, 110B to hold sections 110A, 110B in firm abutment. Connectors 170 may be spring clips, for example. After the user has imaged one or more documents on the enlarged imaging surface and device 100 is off or idle, the user may reverse the operations and return device 100 to the folded position, thereby reducing the desktop footprint of device 100. Naturally, device 100 may be disposed on a mounting surface other than a desktop, for example, a cart, a shelf, a stand or the floor. Moreover, device 100 may partially overhang the mounting surface in the folded or unfolded position.

Figure 3:
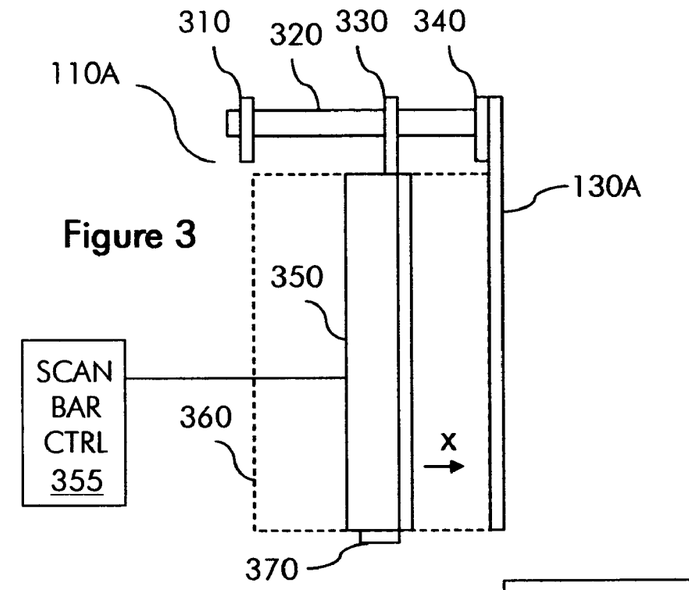
FIG. 3 is a top view of imaging elements of the imaging device of FIG. 1 in a folded position.

FIG. 3 shows imaging elements of imaging device 100 when device 100 is in the folded position as shown in FIG. 1. Imaging elements are located within upper section 110A beneath upper section lid 120A. Upper section 110A has a reduced imaging surface 360 in the form of a glass platen or other transparent platen surface on the upper surface of section 110A. In some embodiments, reduced imaging surface 360 has a width (x-direction) of 5.75 inches and a height of 8.5 inches. Below reduced imaging surface 360, upper section 110A has a scan bar 350 that is driven by a scan bar controller 355. Scan bar 350 has an extension rod 330 at one end and a wheel 370 at the other. Extension rod 330 is slidably engaged on a guide rod 320 that defines a path for scan bar 350 in the x-direction. The travel distance of scan bar 350 along the x-direction path is restricted by a limit switch 310 at the home position of scan bar 350 and a limit switch 340 at the position of scan bar 350 most remote from the home position. In other embodiments limit sensors may be employed. Limit switch 340 is coupled to upper end panel 130A so that when end panel 130A is removed limit switch 340 is also removed. When a flatbed imaging job is initiated by a user on reduced imaging surface 360, scan bar 350 under the control of controller 355 moves from the home position along the path defined by guide rod 320 and, using a tri-linear charge-coupled device (CCD) sensor array and folded optical path illuminator, collects red-green-blue (RGB) pixel data reflected from a document placed face down on reduced imaging surface 360. When scan bar 350 contacts limit switch 340, scan bar 350 returns to the home position under control of controller 355. The collected pixel data may then be applied, for example, to create a file of the scanned image or photocopy of the scanned image, depending on user requirements. In some embodiments, the array sensor count and level of control over the motion of scan bar 350 are sufficient to deliver an effective pixel resolution of at least 600×600 pixels per square inch for each color channel.

Figure 4:
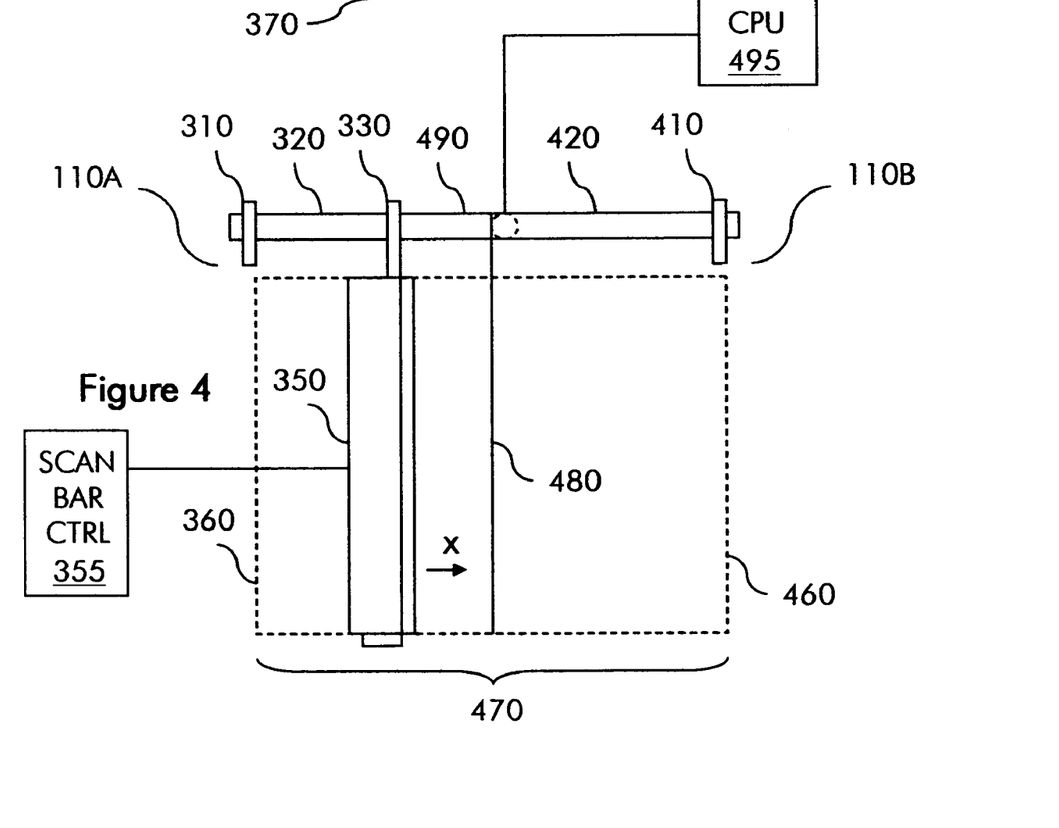
FIG. 4 is a top view of imaging elements of the imaging device of FIG. 1 in an unfolded position.

FIG. 4 shows imaging elements of imaging device 100 when device 100 is in the unfolded position as shown in FIG. 2. Imaging elements include an enlarged imaging surface 470 formed from reduced imaging surface 360 of upper section 110A and an imaging surface 460 of lower section 110B, which may be a glass platen or other transparent platen surface, that comes into abutment with surface 360 after lower section 110B is fully rotated about hinge 140. In some embodiments, enlarged imaging surface 470 has a width (x-direction) of 11.5 inches and a height of 8.5 inches. Below enlarged imaging surface 470, an extended guide rod is formed from guide rod 320 of upper section 110A and a guide rod 420 of lower section 110B that comes into abutment with rod 320 after lower section 110B is fully rotated about hinge 140. The extended guide rod defines an extended path for scan bar 350 in the x-direction. The extended travel distance of scan bar 350 along the x-direction path is restricted by limit switches 310, 410. When a flatbed imaging job is initiated by a user on enlarged imaging surface 470, scan bar 350 moves along the path defined by the extended guide rod and collects RGB pixel data reflected from a document placed face down on enlarged imaging surface 470.

Device 100 has a sensor 490 that detects when enlarged imaging surface 470 is configured and reports the configuration to a processor (CPU) 495. When processor 495 is notified of such configuration, processor 495 executes image repair software to repair defects in scanned images, such as distortions and deletions, attributable to the platen junction 480 between imaging surfaces 360, 460. Such defects may be introduced while collecting data from portions of a document at or near the platen junction 480 between imaging surfaces 360, 460 and may be caused by optical or mechanical perturbations. Such distortions and deletions may be caused by, for example, diffraction, internal reflections of the illumination source and spatial errors introduced as scan bar 350 crosses the joint between guide rods 320, 420. Image repair processing may include, for example, spatial regularization, localized color misregistration correction, pixel and sub-pixel illumination variance correction, occlusion removal and feature data restoration. Because the location of junction 480 is fixed, a predetermined set of raster lines surrounding junction 480 can be targeted and repaired.

Figure 5:
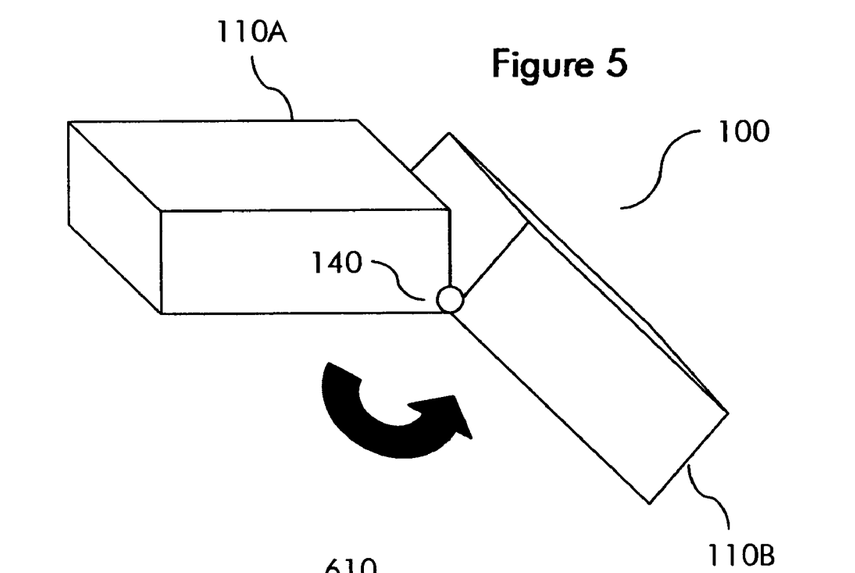
FIG. 5 is a perspective view of the imaging device of FIG. 1 in a partially unfolded and unstable position.

FIG. 5 shows imaging device 100 in a partially unfolded and unstable position. Lids 120A, 120B are removed and unfolding of device 100 about hinge 140 is stopped at a convenient angular offset from full rotation, for example, between 30 and 60 degrees from full rotation, to provide an enlarged but low-stress imaging surface for imaging bound documents. A book, for example, can be draped across an enlarged imaging surface formed from reduced imaging surfaces 360, 460 with the spine portion of the book that typically contains no printed material bridging the gap between sections 110A, 110B. In such an angular arrangement, the chance of overstressing the spine and harming the book binding is reduced relative to a flat imaging surface, while the printed material in the book is still completely captured.

Figure 6:
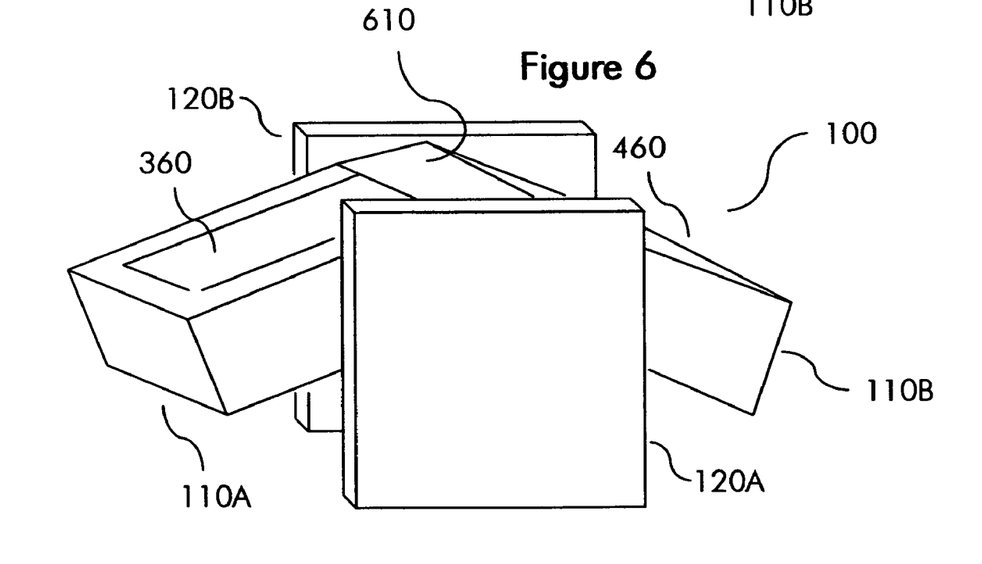
FIG. 6 is a perspective view of the imaging device of FIG. 1 in a partially unfolded and stable position.

FIG. 6 shows imaging device 100 in a partially unfolded and stable position suitable for imaging bound documents. After unfolding about hinge 140 is stopped at a convenient angular offset from full rotation, device 100 is engaged with lids 120A, 120B to support the angular arrangement. Engagement may be achieved, for example, by coupling preformed prongs projecting from the sidewalls of sections 110A, 110B with preformed slots in lids 120A, 120B. A gap cover 610 inserted into the gap between sections 110A, 110B prevents contaminants from penetrating the device cavity and provides added stability for the angular arrangement. An angular enlarged imaging surface is formed from reduced imaging surfaces 360, 460. Gap cover 610 has a mechanical drive connection that permits scan bar 350 to travel between sections 110, 1110B. Alternatively, each section may have a dedicated scan bar assembly and controller and a gap cover may provide limit switches that prevent over-travel of the dedicated scan bars into the gap between the sections. Sensor 490 detects when the angular enlarged imaging surface shown in FIG. 6 is configured and reports such configuration to processor 495. Processor 495 executes image correction software to repair defects in scanned images caused by, for example, gap cover optical property distortions, mechanically induced spatial distortions and residual page curl wrapping.

Figure 7:
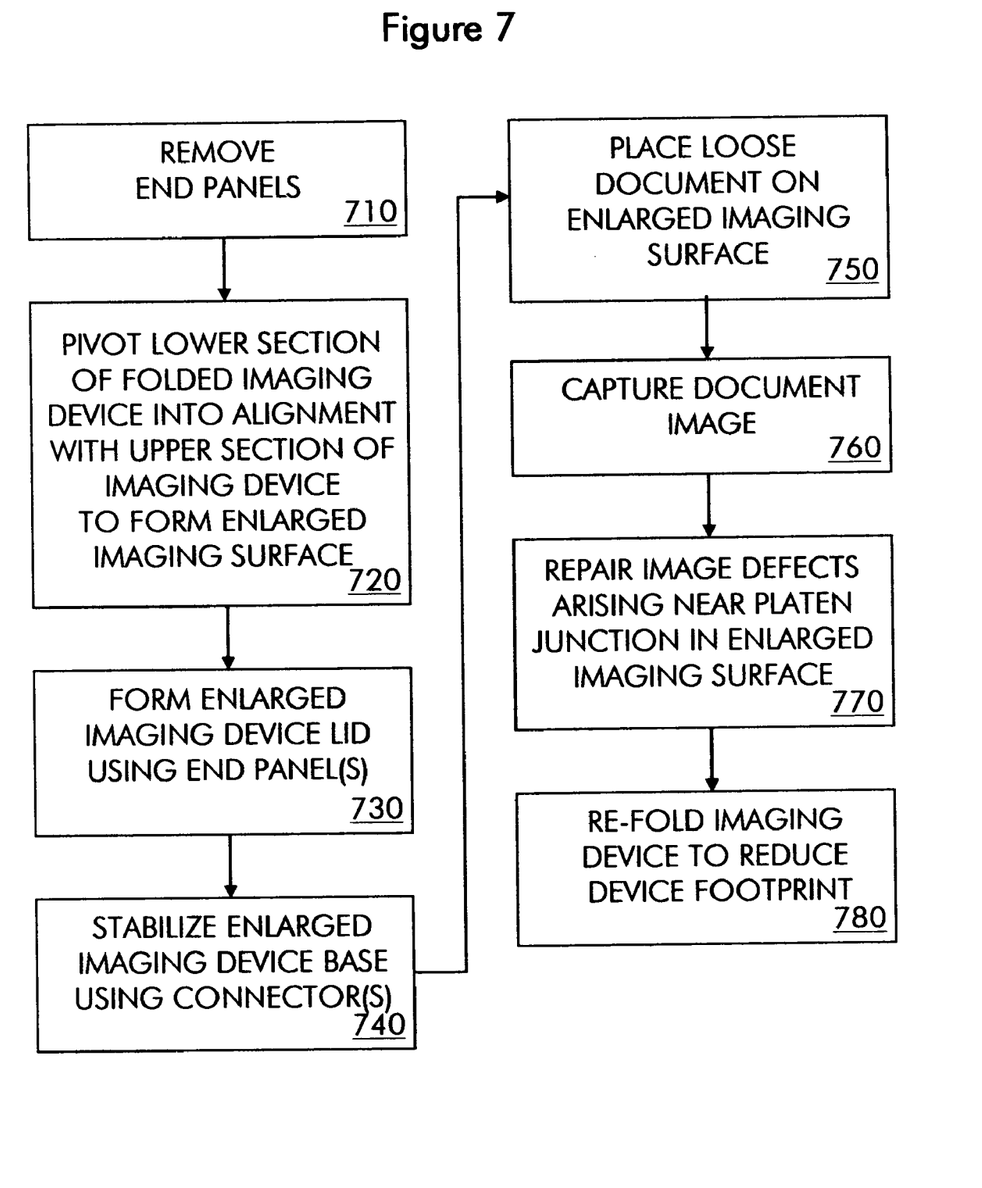
FIG. 7 is a flow diagram of a method for adjusting the imaging device of FIG. 1 to meet loose document imaging requirements.

FIG. 7 shows a method for adjusting imaging device 100 to meet loose document imaging requirements in some embodiments of the invention. Device 100 begins in the folded position. End panels 130A, 130B are removed from device 100 (710) and lower section 110B is fully rotated about hinge 140 into alignment with upper section 110A to form enlarged imaging surface 470 (720). At least upper end panel 130A is inserted into slot 150 in upper section 110A and a counterpart slot in lower section 110B to form an enlarged lid (730). Connectors 170 are engaged to stabilize the enlarged device base formed from upper section 110A and the fully rotated lower section 110B (740). A loose document is placed on enlarged imaging surface 470 (750). The enlarged lid is brought down to hold the document in place and the document image is captured using scan bar 350 (760). Image defects caused by the platen junction 480 in enlarged imaging surface 470 are repaired using image correction software (770). Once imaging operations are complete, device 100 is re-folded to reduce the footprint of device 100 on a desktop or other mounting surface (780).

Figure 8:
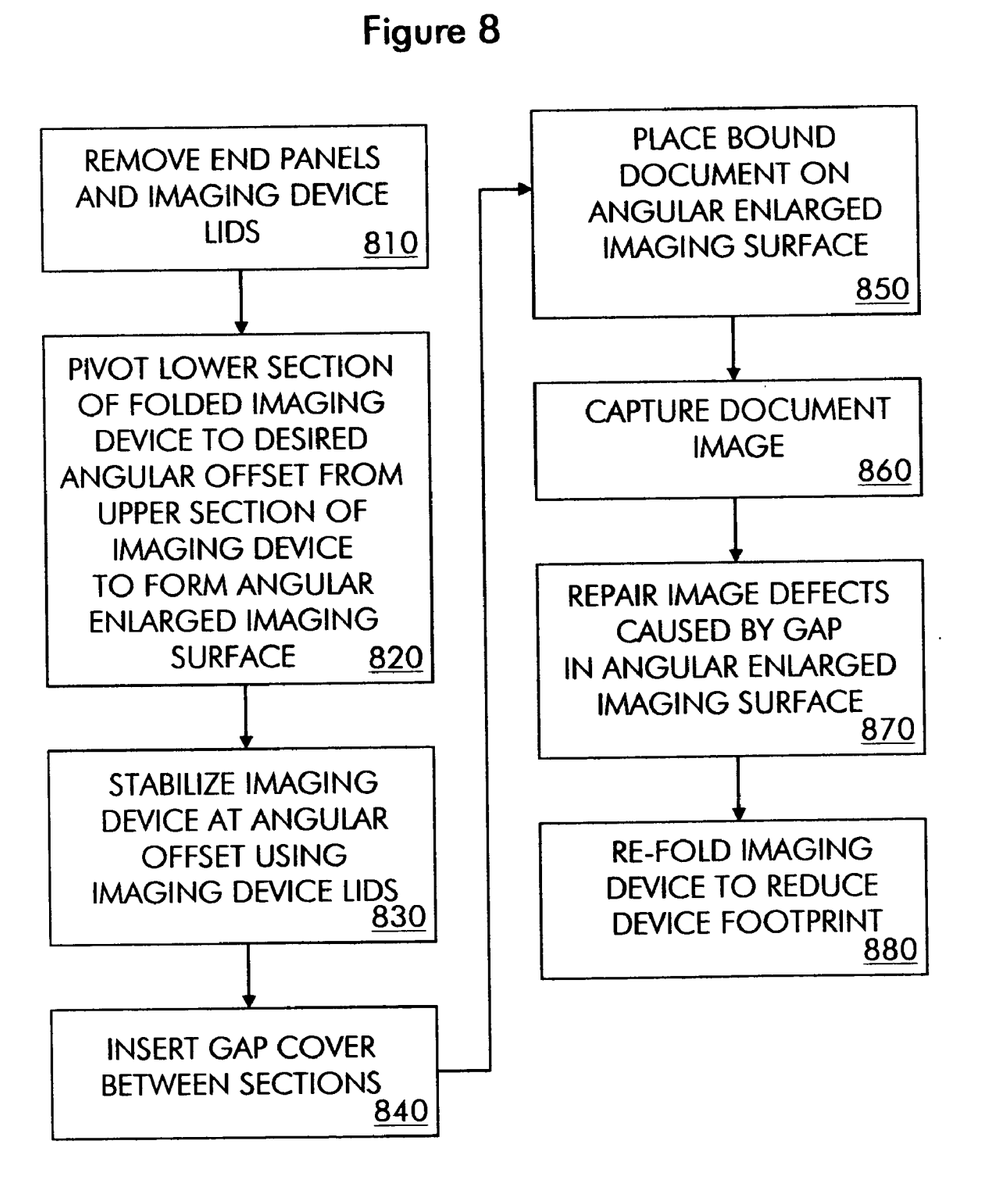
FIG. 8 is a flow diagram of a method for adjusting the imaging device of FIG. 1 to meet bound document imaging requirements.

FIG. 8 shows a method for adjusting imaging device 100 to meet bound document imaging requirements. Device 100 begins in the folded position. End panels 130A, 130B and lids 120A, 120B are removed from device 100 (810) and lower section 110B is pivoted to a desired angular offset from alignment with upper section 110A to form an angular enlarged imaging surface (820). Lids 120A, 120B are coupled to device 100 to stabilize device 100 at the desired angular offset (830). Gap cover 610 is inserted between upper section 110A and lower section 110B to prevent intrusion of contaminants into the device cavity and provide further stability (840). A bound document is placed on the angular enlarged imaging surface (850). The document image is captured using one or more scan bar assemblies and controllers (860). Image defects caused by the gap between the upper section 110A and the lower section 110B are repaired using image correction software (870). Once imaging operations are complete, device 100 is re-folded to reduce the footprint of device 100 on a desktop or other mounting surface (880).

Figure 9:
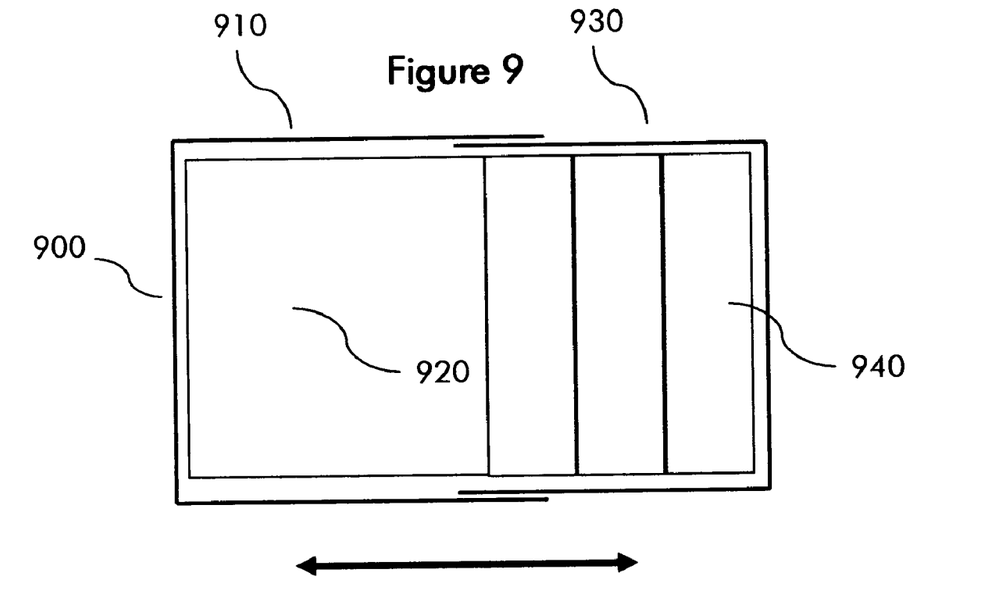
FIG. 9 is a top view of an imaging device in an unfolded position in other embodiments of the invention.

FIG. 9 is a top view of an imaging device 900 in an unfolded position in other embodiments of the invention. In these embodiments, imaging device 900 may be slidably lengthened to an extended position and shortened to a collapsed position to realize an imaging surface that meets the imaging needs of the user while minimizing the footprint of device 900. When device 900 is off or idle and a user of device 900 has a flatbed imaging job that requires an enlarged imaging surface, the user of device 900 slides extendable section 930 of device 900 away from base section 910 of device 900 to form an enlarged imaging surface that includes base imaging surface 920 as well as nestable panels 940, and thereby meet requirements for an enlarged imaging surface. The desktop footprint made by device 900 is enlarged incident to enlarging the imaging surface. When the user has met his or her imaging needs that require an enlarged imaging surface, the user slides extendable section 930 toward base section 910 to form a reduced imaging surface that includes only base imaging surface 920, or base imaging surface 920 and less than all panels 940.

Figure 10:
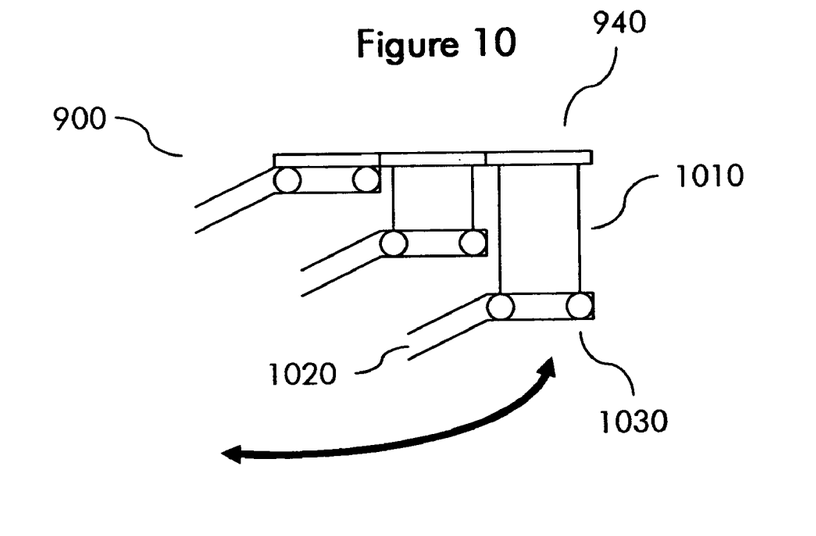
FIG. 10 is a partial side view of the imaging device of FIG. 9 in the unfolded position.

FIG. 10 is a partial side view of imaging device 900 in the unfolded position. Internal to imaging device 900, nestable panels 940 are operatively coupled to wheels 1030 on a collapsible track 1020. Coupling of at least some of panels 940 is made via vertical support members 1010. When the user slides extendable section 930 away from base section 910, collapsible track 1020 extends and wheels 1030 roll along the extending track 1020 to bring panels 940 into horizontal alignment adjacent base imaging surface 920 and form an enlarged imaging surface. When the user slides extendable section 920 toward base section 910, collapsible track 1020 collapses and wheels roll along the collapsing track 1020 to bring panels 940 into a nested position.

It will be appreciated by those of ordinary skill in the art that the invention can be embodied in other specific forms without departing from the spirit or essential character hereof. For example, in some embodiments, the tri-linear CCD sensor array and folded optical path illuminator on scan bar 350 are replaced by one or a plurality of two-dimensional imaging arrays and area illuminators. When two-dimensional imaging arrays and area illuminators are used on scan bar 350, image processing is applied to stitch area capture images of documents together to form a contiguous whole or as regionalized sub-images of identified content. Such processing removes image distortion introduced by wide-field image optics and compensates for illumination variation. Scan bar 350 need not move in a continuous manner, but can advance and stop to image areas on the imaging surface. Similarly, area illuminators may be turned on and off as required or may be in the nature of a photoflash.

In still other embodiments, the tri-linear CCD sensor array and folded optical path illuminator on scan bar 350 are replaced by one or a plurality of fixed location two-dimensional imaging arrays and area illuminators. When fixed location two-dimensional imaging arrays and area illuminators are used, image processing is applied to stitch area capture images of documents together to form a contiguous whole or as regionalized sub-images of identified content, including processing to remove image distortion introduced by wide-field image optics and compensate for illumination variation. In the case of a single two-dimensional imager, auxiliary mirrors and optics are employed to permit imaging of the imaging surface with sequential electromagnetic reconfiguration of the optical imaging path to image additional imaging surface segments when unfolded or extended. Information derived from mechanical configuration sensing is used to determine which area illuminators are to be activated. In the case of a plurality of two-dimensional imagers, each imager acquires image data from each or a section of each, imaging surface segment, with utilization of illumination sources determined from mechanical configuration sensing and from the capture control utilized for the imagers. As with the data obtained using a tri-linear CCD sensor array, image repair processing is applied to repair defects near platen junctions.

The present description is therefore considered in all respects to be illustrative and not restrictive. The scope of the invention is indicated by the appended claims, and all changes that come within the meaning and range of equivalents thereof are intended to be embraced therein.

What is claimed is:

1. An imaging device having an adjustable imaging surface and an adjustable housing, comprising:
    a first section having a first imaging surface; and
    a second section coupled with the first section and having a second imaging surface, wherein the imaging device is adjustable between a first position and a second position making through relative movement of the first section and the second section, wherein in the first position the adjustable imaging surface is a reduced imaging surface that includes the first imaging surface and a bottom surface of the adjustable housing is reduced, and wherein in the second position the adjustable imaging surface is an enlarged imaging surface that includes the first imaging surface and the second imaging surface and the bottom surface of the adjustable housing is enlarged.

2. The imaging device of claim 1, wherein the first imaging surface and the second imaging surface are transparent platen surfaces.

3. The imaging device of claim 1, wherein the imaging device has software executable by a processor to repair imaging defects attributable to a junction between the first imaging surface and the second imaging surface.

4. The imaging device of claim 1, wherein the imaging device is selected from the group consisting of a scanner, copier and a multifunction printer (MFP).

5. The imaging device of claim 1, wherein the first position comprises a folded position and the second position comprises an unfolded position.

6. The imaging device of claim 1, wherein the relative movement comprises pivoting about a hinge.

7. The imaging device of claim 1, wherein the first imaging surface abuts the second imaging surface while the imaging device is in the second position.

8. The imaging device of claim 1, wherein a connector holds the first section and the second section in abutment while the imaging device is in the second position.

9. The imaging device of claim 1, wherein the first section and the second section have respective lids and removable end panels while the imaging device is in the first position and wherein after removal at least one of the end panels conjoins the lids while the imaging device is in the second position.

10. The imaging device of claim 1, wherein the first imaging surface and the second imaging surface are at an angular offset while the imaging device is in the second position.

11. The imaging device of claim 1, wherein a gap cover is interposed between the first imaging surface and the second imaging surface while the imaging device is in the second position.

12. The imaging device of claim 1, wherein the first section and the second section have respective removable lids while the imaging device is in the first position and wherein after removal at least one of the lids holds the first section and the second section at the angular offset while the imaging device is in the second position.

13. The imaging device of claim 1, wherein the first position comprises a collapsed position and the second position comprises an extended position.

14. The imaging device of claim 1, wherein the relative movement comprises sliding.

15. A method for adjusting an imaging device to meet present imaging requirements, comprising the steps of:
    pivoting a first section of the imaging device about a hinge whereby an adjustable imaging surface and a bottom surface of an adjustable housing of the imaging device are enlarged;
    imaging a document on the enlarged adjustable imaging surface; and
    pivoting the first section about the hinge whereby the adjustable imaging surface and the bottom surface are reduced.

16. The method of claim 15, wherein the imaging device has a second section and the enlarged adjustable imaging surface comprises a first imaging surface of the first section and a second imaging surface of the second section.

17. The method of claim 15, further comprising repairing imaging defects introduced during the imaging step that are attributable to a junction between a first imaging surface and a second imaging surface of the enlarged adjustable imaging surface.

18. A method for adjusting an imaging device to meet present imaging requirements, comprising the steps of:
    sliding a first section of the imaging device away from a second section of the imaging device whereby an adjustable imaging surface and a bottom surface of an adjustable housing of the imaging device are enlarged;
    imaging a document on the enlarged adjustable imaging surface; and
    sliding the first section toward the second section whereby the adjustable imaging surface and the bottom surface are reduced.

19. The method of claim 18, further comprising repairing imaging defects introduced during the imaging step that are attributable to a junction between a first imaging surface and a second imaging surface of the enlarged adjustable imaging surface.

* * * * *